United States Patent [19]

Takiyama et al.

[11] Patent Number: 5,310,782
[45] Date of Patent: May 10, 1994

[54] METHOD FOR MANUFACTURING BIODEGRADABLE HIGH MOLECULAR ALIPHATIC POLYESTER

[75] Inventors: Eiichiro Takiyama, Kamakura; Takashi Fujimaki, Yokohama; Shigekatu Seki; Takao Hokari, both of Takasaki; Yoshitaka Hatano, Higashikanbara, all of Japan

[73] Assignee: Showa Highpolymer Co., Ltd., Tokyo, Japan

[21] Appl. No.: 69,605

[22] Filed: Jun. 1, 1993

[30] Foreign Application Priority Data

May 29, 1992 [JP] Japan .................................. 4-139063
Apr. 7, 1993 [JP] Japan .................................. 5-080739

[51] Int. Cl.$^5$ ............................................. C08L 75/00
[52] U.S. Cl. ..................... 524/706; 524/710; 528/55; 528/56; 528/57; 528/58
[58] Field of Search ............... 524/706, 710; 528/55, 528/56, 57, 58

[56] References Cited

U.S. PATENT DOCUMENTS 4,990,594 2/1991 Cooke et al. .................. 524/706

Primary Examiner—Maurice J. Welsh
Attorney, Agent, or Firm—Sughrue, Mion, Zinn, Macpeak & Seas

[57] ABSTRACT

A method for manufacturing a biodegradable high molecular weight aliphatic polyester. This method comprises the steps of: [A] synthesizing an aliphatic polyester having a number average molecular weight of at least 5,000 and/or a weight average molecular weight of at least 30,000 by reacting aliphatic or alicyclic glycol with aliphatic dicarboxylic acid or its anhydride, applying a 0.001-0.5 part by weight of organic or inorganic metallic compound as a catalyst with respect to 100 parts by weight of aliphatic polyester to be produced; [B] adding a 0.01-3 parts by weight of organic or inorganic phosphorus compound with respect to 100 parts by weight of aliphatic polyester upon completion of the reaction; and [C] reacting a 0.1-5 parts by weight of polyvalent isocyanate compound with 100 parts by weight of the aliphatic polyester so that the polyester has a number average molecular weight of at least 10,000 and/or a weight average molecular weight of at least 50,000.

4 Claims, No Drawings

METHOD FOR MANUFACTURING BIODEGRADABLE HIGH MOLECULAR ALIPHATIC POLYESTER

BACKGROUND OF THE INVENTION

1. Field of the Invention

The present invention relates to a method for manufacturing a biodegradable high molecular weight aliphatic polyester that is a biodegradable and has characteristics that are applicable to conventional uses of conventional polyolefins. Further, the present invention relates more particularly to a method for manufacturing a biodegradable high molecular weight aliphatic polyester which is stable when manufacturing molded products by a variety of molding methods and is preferable for manufacturing such products as films, blow molding products, sheets, filaments and foamed products etc.

The term "biodegradable" used in this specification means a sample having the characteristics of being able to be broken down by microorganisms and losing its original form, a certain time lapse after the sample is embedded in natural soil or water.

2. Background of the Invention

From the standpoint of environmental protection in recent years, biodegradable plastics have attracted public attention, such that polymers having sufficient physical characteristics to meet practical requirements, the necessary molding properties and cost effectiveness are eagery wanted.

A type of polymer in which starch is included in polyethyrene has conventionally been realized as a film, but this could not attain the above purposes since the polyethyrene still remains as it is and even the starch portion is broke down in the soil.

A number of trials have been made to manufacture biodegradable plastics using materials produced by natural materials or organisms, some of which are practically realized ("Practical Biodegradable Plastics", CMC Publishing (1992)).

However, there have not been any biodegradable plastics with sufficient characteristics and molding properties to replace conventional general plastics.

Although it is known that aliphatic polyesters are biodegradable, at the same time they not only have the problem of instability resulted in poor molding properties, but they also have the defect of not being able to increase their molecular weights to the extent which indicates useful characteristics. Thus, no aliphatic polyesters having sufficiently high molecular weight for practical use have been known yet.

The present inventors have recently discovered a new method for a manufacturing biodegradable aliphatic polyester which is useful for a variety of applications and for manufacture of molded products. This new method comprises applying a 0.1-5 parts by weight of polyfunctional isocyanate to react with a 100 parts by weight of a polyester having a number average molecular weight of at least 5,000, preferably 10,000 and substantially hydroxyl groups as terminal groups, resulting in a number average molecular weight of at least 10,000, preferably 20,000.

However, the remaining problem that was found was that the metallic compound catalyst used in synthesizing the polyester remains and acts conversely as a decomposer for the polyester at the time of molding polyeser when maintained for a long time at a high temperature e.g. of 200° C. or more, particularly when in contact with air. As a result, the polyester loses its thermal stability so as to be excessively colored and is reduced in molecular weight, sometimes resulting in a lowering of the molded product quality.

In conventional methods for manufacturing polyesters containing aromatic structures such as polyethylene terephtalate and polybutylene terephtalate. It has been known that aromatic phosphoric acid ester or phosphorous acid ester such as triphenyl phosphite is added to prevent coloring. These phosphorus compounds act to reduce the effect of the metallic compound catalyst and are added after and not during the reaction, and these are particularly in the manufacture of urethane rubber.

Namely, if any activity of the catalyst remains, transesterification would arise between the hard resin parts and the soft rubber parts, but this transesterification should be restricted to a minimum for providing rubbers of good quality rubber. Too much transesterification would render a condensation product of both components which acts to significantly degrade the characteristics of rubber. Therefore, the relationship between the phosphorus compounds and the catalyst, i.e. the used ratio of both is typically adjusted such that part oi the activity of the catalyst remains.

However, such a method as simply adding the aforementioned phosphorus compounds after the synthesizing reaction of the aliphatic polyester would not avoid the undesirable docompositional reactions such as coloring during the molding process at high temperaturs or the reductions in molecular weight.

SUMMARY OF THE INVENTION

The present inventors, as a result of various investigations into obtaining high molecular weight biodegradable aliphatic polyester which has improved thermal stability, at least the same physical and molding characteristics as conventionally used polyolefins, and optimum manufacturing cost effectiveness, have discovered that the above purpose can be achieved by adding upon termination of a deglycol reaction with a metallic compound catalyst, a sufficient amount of phosphorus compound to suppress the catalytic reaction of the metallic compound, stopping the catalytic reaction, and by reacting the product with a polyfunctional isocyanate compound, thus, achieving the present invention.

Namely, a first embodiment of the present invention provides a method for manufacturing biodegradable high molecular weight aliphatic polyester comprising the steps of:

[A] synthesizing an aliphatic polyester having a number average molecular weight of at least 5,000 by reacting aliphatic or alicyclic glycol with aliphatic dicarboxylic acid or its anhydride, applying a 0.001-0.5 part by weight of organic or inorganic metallic compounds as reactive catalyst to each 100 parts by weight of aliphatic polyester to be produced:

[B] adding a 0.01-3 parts by weight of organic or inorganic phosphorus compounds to each 100 parts by weight of aliphatic polyester upon completion oi the reaction: and

[C] reacting a 0.1-5 parts by weight of polyfunctional isocyanate compound to each 100 parts by weight of the aliphatic polyester so that the polyester has a number average molecular weight of at least 10,000.

Further, a second embodiment oi the present invention provides a method for manufacturing biodegradable high molecular weight aliphatic polyester comprising the steps of:

[A] synthesizing an aliphatic polyester having a weight average molecular weight of at least 30,000 by reacting aliphatic or alicyclic glycol with aliphatic dicarboxylic acid or its anhydride, applying a 0.001-0.5 part by weight of organic or inorganic metallic compounds as reactive catalyst to each 100 parts by weight of aliphatic polyester to be produced;

[B] adding a 0.01-3 parts by weight of organic or inorganic phosphorus compounds to 100 parts by weight of aliphatic polyester upon completion of the reaction; and

[C] reacting 0.1-5 parts by weight of polyfunctional isocyanate compound to each 100 parts by weight of the aliphatic polyester so that the polyester has a weight average molecular weight of at least 50,000.

Further, a third embodiment of the present invention provides a method for manufacturing biodegradable high molecular weight aliphatic polyester comprising the steps of:

[A] synthesizing an aliphatic polyester having a number average molecular weight of at least 5,000 and a weight average molecular weight of at least 30,000 by reacting aliphatic or alicyclic glycol with aliphatic dicarboxylic acid or its anhydride, applying 0.001-0.5 part by weight of organic or inorganic metallic compounds as reactive catalyst to each 100 parts by weight of aliphatic polyester to be produced;

[B] adding a 0.01-3 parts by weight oi organic or inorganic phosphorus compounds to each 100 parts by weight of aliphatic polyester upon completion of the reaction; and

[C] reacting a 0.1-5 parts by weight of polyfunctional isocyanate compound with 100 parts by weight of the aliphatic polyester so that the polyester has a number average molecular weight of at least 10,000 and a weight average molecular weight of at least 50,000.

Further, the present invention provides a method for manufacturing biodegradable high molecular weight aliphatic polyester according to the aforementioned first, second and third embodiments, wherein at least one kind of multifunctional compound selected from a group consisted of polyhydric alcohol having at least three functional groups, polybasic carboxylic acid having at least three functional groups or its anhydride, and oxycarboxylic acid having at least three functional groups, at the reaction of the aliphatic or alicyclic glycol with the aliphatic dicarboxylic acid or its anhydride in the step [A].

Namely, it has been discovered that such undesirable troubles arising from the decompositional reaction as the coloring phenomenon that occurs while being maintained at high temperatures and the reduction in the molecular weight can be almost completely overcome by adding organic or inorganic phosphorus compounds.

Also, it has been revealed that no thermally stabilizing effect can be obtained even if the polyfunctional isocyanate compound is reacted without deactivating the metallic compound catalyst and the organic or inorganic phosphorus compounds are added thereafter, though the specific mechanism thereof is not clear.

The above and other advantages, features and additional objects of this invention will be manifest to those versed in the art upon making reference to the following detailed description in which embodiments of this invention are shown.

DETAILED DESCRIPTION OF THE PRESENT INVENTION

The present invention will now be described in further detail.

Aliphatic Polyester

The aliphatic polyester used in the present invention is synthesized by: using, as raw material, (1) aliphatic or alicyclic glycol and aliphatic dicarboxylic acid or its anhydride, or (2) aliphatic or cyclic aliphatic glycol, aliphatic dicarboxylic acid or its anhydride and at least one kind of multifunctional compound selected from a group consisted of polyhydric alcohol having at least three functional groups, polybasic carboxylic acid having at least three functional groups or its anhydride and oxycarboxylic acid having at least three functional groups; esterifying (dehydrocondensing) these components; and deglycolizing under the presence of a metallic compound catalyst.

After the deglycolization, number average molecular weight of the aliphatic polyester may be at least 5,000, preferably at least 10,000 (first and fourth invention); its weight average molecular weight may be at least 30,000, preferably 34,000 (second and fourth invention); its number average molecular weight and its weight average molecular weight may be respectively at least 5,000 and 30,000, preferably at least 10,000 and 34,000 respectively (third and fourth invention).

If the number average molecular weight is less than 5,000, or the weight average molecular weight is less than 30,000, or the number average molecular weight is less than 5,000 and the weight average molecular weight is less than 30,000, the amount of the polyfunctional isocyanate compound added must necessarily be increased to provide the desired characteristics. This increased amount of polyfunctional isocyanate compound would significantly increase the possibility of gelation during the melt-mixing process with the polyester.

Aliphatic or alicyclic glycols include, for example: ethylene glycol; 1,4-butanediol; 1,6-hexanediol; nonamethylene glycol: decamethylene glycol; propylene glycol; 1,3-butanediol; 2-methylpropanediol-1,3; neopentyl glycol; 1,4cyclohexanedimethanol: bisphenol A ethylene oxide addition product; and bisphenol A propylene oxide addition product.

Among these glycols, those having straight chain alkylene groups with even number (2, 4, 6, 8 and 10) of carbons are preferable. In particular, ethylene glycol, 1,4-butanediol and 1,4-cyclohexanedimethanol are more preferable for increasing the melting point of the produced aliphatic polyester, imparting the biodegradability, and assuring the desirable molding characteristics similar to polyolefins.

As the aliphatic dicarboxylic acid or its anhydride for esterificating with the aforementioned aliphatic or alicyclic glycol, there are for example: succinic acid; succinic anhydride; adipic acid; adipic anhydride; suberic acid; sebacic acid; dodecadinoic acid; and cyclohexanedicarboxylic acid.

Among these aliphatic dicarboxylic acids or anhydrides, those having straight chain alkylene groups with even numbers (2, 4, 6, 8 and 10) of carbons are preferable. In particular, succinic acid, succinic anhydride, adipic acid, suberic acid, sebacic acid or the dodecadinoic acid are more preferable, as in the case of the above-noted glycols, for increasing the melting point of the produced aliphatic polyester, imparting the biodegradability, and assuring the desirable molding characteristics similar to the polyolefins.

Particularly preferable combinations of the aliphatic or alicyclic glycol and the aliphatic dicarboxylic acid or its anhydride are: ethyleneglycol and succinic acid; 1,4-butanediol and succinic acid; 1,4-butandiol, succinic acid and sebacic acid; 1,4-cyclohexanedimethanol and adipic acid; and 1,4-cyclohexanedimethanol and sebacic acid. These combinations are desirable to elevate the melting point of the aliphatic polyester to be produced, to impart the biodegradability, and to assure the same molding characteristics as in the case of polyolefins.

The ratio of the aliphatic or alicyclic glycol to the aliphatic dicarboxylic acid or its anhydride to be used is, preferably, 1.05–1.2 mol : 1 mol.

The biodegradable high molecular weight polyester according to the present invention, by using at least one kind of multifunctional compound selected from a group consisting of: polyhydric alcohol having at least three functional groups; polybasic carboxylic acid having at least three functional groups or its anhydride; and oxycarboxylic acid having at leas three functional groups within a range that does not disturb the main objective during esterification, would accordingly, for example, expand the molecular weight distribution so that is could be molded into film or sheet form having excellent characteristics.

As examples of the polyhydric alcohol having at least three functional groups, there are: glycerine; trimethyrolpropane; pentaerythrit; and triarylisocyanulateethyleneoxide addition product. Glycidol which is a dehydrated monoepoxy compound can also be used.

As the polyfunctional oxycarboxylic acid having at least three functional groups, any commercial items can be used, but particularly malic acid, tartaric acid and citric acid are preferable because of their availability at low cost.

As examples of the polybasic carboxylic acid having at least three functional groups or its anhydride, there are: trimesic acid; propanetricarboxylic acid; trimellitic anhydride; pyromellitic anhyride; benzophenone-tetracarboxylic anhydride; and cyclopenta-tetracarboxylic anhydride. Among them, trimellitic anhydride and pyromellitic anhydride are particularly preferable.

The components of the aforementioned multifunctional compounds can be used by mutually mixing them, as required. The ratio of the total amount of the multifunctional compounds to be used to the total amount of the aliphatic dicarboxylic acid or its anhydride is 0.1–5 mol% : 100 mol%, and can be added from the beginning of the esterification.

In the present invention, it is necessary to perform the deglycol reaction and to make the number average molecular weight oi the aliphatic polyester be at least 5,000, or its weight average molecular weight be at least 30,000, or preferably the number average molecular weight be at least 5,000 and the weight average molecular weight be at least 30,000. For this end, a catalyst for the deglycol reaction must be added. As examples of this catalyst, there are organic or inorganic metallic compounds of at least one kind of metal selected from a group consisting of: titanium; tin; antimony; cerium; germanium; zinc; cobalt; manganese; iron; aluminium; magnesium; calcium; and strontium. The amount oi the metallic compound to be used is a 0.001–0.5 part by weight for each 100 parts by weight of the aliphatic polyester to be produced.

If the amount to be used of the metallic compound catalyst is less than a 0.001 part by weight, the deglycol reaction would become retarded to be impractical, while if it is more than 0.5 part by weight, the decompositional reaction would be undesirably enhanced.

The preferable amount is a 0.005–0.2 part by weight depending on the kind of the metal. As examples of the metallic compound catalysts, there are metallic alkoxide, salt of organic acid, chelate and oxides etc. In particular, titanic organic compounds such as alkyl ester titanate, titanoxyacetylacetonate, or titanium oxylate etc. are preferable.

While so-called biodegradable polyesters are subject to microbial breakdown in soil, metallic catalysts or metals are seen as remaining in the soil so that they have to be nonnoxious. From such a point of view, preferable metals would be titanium, germanium, zinc, magnesium, and calcium etc.

The esterification can be carried out at 160°–230° C. for 5–16 hours, preferably under inert gas atmosphere. If the temperature is lower than that range, the reaction rate would be too slow to be practical, while if the temperature is higher than that range, there would be a fear of decomposition. Accordingly, it is desirable to perform a first-stage esterification at a temperature of 180°–220° C.

The esterification is continued until the acid value of the aliphatic polyester becomes 30 or less, preferably 15 or less, more preferably not to exceed 10. In this case, the larger the molecular weight, the smoother the molecular weight increase by the deglycol reaction. Therefore, those of high molecular weight are preferable.

The deglycol reaction is carried out at 170°–230° C. for 2–16 hours under a decreased pressure oi up to 5 Torr. In view of the reaction rate and the prevention of the decomposition, it is more preferable to perform the reaction at 180°–210° under a highly vacuum state not exceeding 1 Torr. The resulting polyester has substantially hydroxyl groups as terminal groups and zero acid value.

The thus obtained aliphatic polyester must have a number average molecular weight of at least 5,000, or a weight average molecular weight of at least 30,000, or a number average molecular weight of at least 5,000 and a weight average molecular weight of at least 30,000. Further, it is preferable that the polyester have a melting point of at least 70° C. for assuring the same characteristics and molding properties as in the case of polyolefins such as polyethylene and manufacturing molded products using a molding machine for polyolefin such as polyethylene. However, in cases where the melting point of the aliphatic polyester can be lower than 70° C. (e.g. in the case of rubber), a melting point lower than 70° C. can be used. If the number average molecular weight is less than 5,000, or the weight average molecular weight is less than 30,000, or the number average molecular weight is less than 5,000 and the weight average molecular weight is less than 30,000, the amount of the polyfunctional isocyanate compound to be added in the subsequent state would necessarily be increased. This would enhance the possibility of gelation and cause the formulation of a number of micro-gels in the polyester, such that no desired molded product can be obtained.

A characteristic feature of the present invention lies in subsequently adding an organic or inorganic phosphorus compound. For example, the phosphorus compound can be added to the aforementioned resulting aliphatic polyester that is, in a molten state. This phosphorus compound would act as a stabilizer, i.e. to enhance its stability against heating, to prevent the discoloring, and to reduce the alteration of viscosity.

As the phosphorus compound used in the method of the present invention, there are:

(a) Phosphoric acids and its alkylesters:

As commercial items, there are trialkylesters such as trimethylphosphate, triethylphosphate, tributylphosphate, trioctylphosphate and tridecylphosphate, and alkyl acidic phosphates (having alkyl group of methyl, isopropyl, butyl or octyl etc.).

(b) Phosphonic acid organic esters:

As commercial items, dibutylbutylphosphonate etc. can be used.

(c) Phosphorous acid:

This acid acts to impart the strongest hue stabilizing effect and to prevent the oxidative decomposition when used together with other phosphorus compounds.

(d) Phosphorous acid organic esters:

For example, dibutyl hydrogen phosphite is commercially available for use in the present invention. Alternatively, there are triphenylphosphite, diphenylisodecylphosphite, phenyldiisodecylphosphite, tris(mono and-/or dinonilphenyl) phosphite, trisisodecylphosphite etc.

(e) Inorganic phosphorus compounds:

For example, polyphosphoric acid can be nominated.

Since a majority of commercially available phosphoric acids contain water, polyphosphoric acid is more advantageous practically because it does not cause any reduction in the molecular weight of the polyester. Phosphorous pentoxide can also be used, but it is difficult to handle because of its high hygroscopicity. In the case of polyolefins and the like, while the inorganic phosphorus compounds e.g. phosphoric acid and phosphorous acid are directly used, they are difficult to be uniformly mixed due to their poor mixing characteristics. The aliphatic polyester, meanwhile, can be directly mixed at high temperatures, so long as attention is paid to the water contained in the phosphorus compound. Among the aforementioned phosphorus compounds, phosphorous acid and phosphorous acid organic esters present excellent effects sufficient to be used for the purpose of the present invention, so as to be mainly described hereafter.

The amount of the phosphorus compound to be used in this invention depends on the kind and the amount of the metallic compound catalyst used for the deglycol reaction, but typically is 0.01-3 parts by weight and more preferably 0.01-1 part by weight for 100 parts by weight of the aliphatic polyester produced after the deglycol reaction. As to the phosphorous acid, it is 0.01-0.05, preferably 0.01-0.3 part by weight. If it is less than 0.01 part by weight, such effects as mentioned above barely appear, while even if it exceeds 3 parts by weight, the effect does not noticeably increase. In the case of the phosphorous acid, no enhanced effect is noted even if it exceeds 0.3 part by weight.

The phosphorus compounds such as the phosphorous acid are added to the aliphatic polyester melted at a temperature oi 150°–250° C.

Another feature of the present invention lies in adding a desired amount of polyfunctional isocyanate to the aliphatic polyester that is in a molten state such that the resulting biodegradable high molecular weight polyester has a number average molecular weight of at least 10,000, or a weight average molecular weight of at least 50,000, or a number average molecular weight of at least 10,000 and a weight average molecular weight of at least 50,000.

The weight average molecular weight has a greater influence on the melt viscosity than the number average one.

For example, in the case of film molding, even when the number average molecular weights are identical, if the weight average molecular weights are different, the molding characteristics would become different, such that the weight average molecular weight should preferably be as large as possible. This is the reason why the weight average molecular weight is used in the present invention.

Polyfunctional Isocyanate Compound

Polyfunctional isocyanate include, for example: 2,4-tolylenediisocyanate; mixture of 2,6-tolylenediisocyanate and 2,4-tolylenediisocyanate; diphenylmethanediisocyanate; xylylenediisocyanate; 1,5naphthylenediisocyanate; xylylenediisocyanate hydride; diphenylmethanediisocyanate hydride; hexamethylenediisocyanate; isophoronediisocyanate: triphenylmethanetriisocyanate; addition product of diisocyanate and polyhydric alcohol: and trimers of diisocyanate.

Among them, those particularly preferable for the present invention from a standpoint of preventing the coloring of the polyester to be produced are the aliphatic and alicyclic diisocyanates such as: hexamethylenediisocyanate: diphenylmethanediisocyanate hydride: xylylenediisocyanate hydride; and isophoronediisocyanate.

The ratio of the polyfunctional isocyanate compound to be used with the aliphatic polyester having the added phosphorus compound is 0.1-5 parts by weight (preferably 0.5-3 parts by weight) : 100 parts by weight. If the former is less than 0.1 parts by weight, its added effect does not sufficiently appear, while if it exceeds 5 parts by weight, there is a fear of gelation.

The addition of the polyfunctional isocyanate compound to the aliphatic polyester is carried out in molten state at a temperature higher than the melting point of the aliphatic polyester. At this time, conventional urethane catalyst can also be used for the reaction.

The biodegradable high molecular weight aliphatic polyester produced according to this invention, having a number average molecular weight of at least 10,000, or a weight average molecular weight oi at least 50,000, or a number average molecular weight of at least 10,000 and weight average molecular weight of at least 50,000, presents biodegradability in natural soil or in water and has no trace of the original form after 3-12 months depending on the composition.

For putting the biodegradable high molecular weight aliphatic polyester Produced according to this invention into practical use, it is a matter oi course to add organic or inorganic fillers, reinforcers, stabilizers, lubricants, oligomers or polymers etc. thereto.

The biodegradable high molecular weight aliphatic polyester produced according to this invention is biodegradable and at least has the same physical, chemical and molding characteristics as conventionally used polyolefins, and in addition can be synthesized at a minimum cost. Further, it does not lose thermal stability to undesirably become colored even when being maintained at high temperatures for a long time, particularly when in contact with air.

EXAMPLES

The present invention will now be described with reference to specific examples, but is not limited thereto.

In these examples, the melting Point is measured by DSC (Differential Scanning Calorimeter). The molecular weight is measured by the following GPC method:

Shodex GPC SYSTEM-11 (manufactured by Showa Dennko K. K.)
Eluent: $CF_3COONa$ 5 mM/HFIP (hexailuoroisopropanol)
Sample column:
HFIP - B800P
HFIP - 80M×2
Reference column:
HFIP - 800R×2
Polymer solution: 0.1 wt. %, 200 μl
Column temperature: 40° C.
Flow rate: 1.0 ml/min
Pressure: 30 kg/cm:
Detector: Shodex RI
Molecular weight standard: PMMA (Shodex STANDARD M-75)

EXAMPLE 1

Synthesis of Aliphatic Polyester (a):

1,000 g of 1,4-butanediol and 1,180 g of succinic acid were put into a separable 3-liter flask equipped with an stirrer, a fractionating condenser, a termometer, and a gas inlet tube, and were then esterified at 200°-205° C. in nitrogen gas flow to have an acid value of 8.9. Thereafter, 0.35 g of tetraisopropyltitanate was added. Finally, deglycol reaction was carried out at 215°-202° C. for eight hours under a vacuumed pressure of 0.5 torr to render aliphatic polyester (a) having a number average molecular weight of 16,800 and a weight average molecular weight of 43,700, in the form of white crystal with a slight ivory color having a melting point of 115° C.

This aliphatic polyester (a) of 500 g was put into a 1-liter separable flask which was then heated to 200° C. in nitrogen gas flow. In this state, 0.5 g of phosphorous acid was added into the flask to turn the color into pure white. Further, 7 g of hexamethylenediisocyanate was added thereto, which swiftly enhanced the viscosity but did not gelate.

The resulting biodegradable high molecular weight aliphatic polyester (A-1) had a melting point of about 117° C., a number average molecular weight of 32,900 and a weight average molecular weight of 102,000.

Separately for comparison, 500 g of aliphatic polyester {a} was melted at 200° C., and 7 g of hexamethylenediisocyanate was added thereto to produce polyester (A-2) with increased viscosity, having a number average molecular weight of 32,500, a melting point of about 117° C., and a weight average molecular weight of 99,200.

The thus produced biodegradable high molecular weight aliphatic polyester (A-1) and the simply viscosity-enhanced polyester (A-2) without adding no phosphrous acid were melted at 200° C. for hue measurement in a liquid state. The results are as follows:

polyester (a) ... Hazen color scale 200
polyester (A-1) ... Hazen color scale 70
polyester (A-2) ... Hazen color scale 450

Further, the hues changed as follows after maintaining at 200° C. for one hour in the air:

| polyester (a) | Hazen color scale 400 |
|---|---|
| polyester (A-1) | Hazen color scale 100 |
| polyester (A-2) | Hazen color scale >500 |
| | Gardner color scale 2-3 |

It can be seen from above comparison that the addition of the phosphorous acid is quite effective for the thermal stability of the hue.

EXAMPLE 2

Ethylene glycol in an amount of 690 g, succinic acid of 1,180 g, germanium dioxide of 3 g and titanoxyaoetylaoetonale of 0.15 g were put into a 3-liter separable flask equipped with a stirrer, a fractionating condenser, a thermometer, and a gas inlet tube, and were then esterified at 200°-205° C. in nitrogen gas flow to have an acid value of 6.1. Thereafter, this was subjected to deglycol reaction at 210°-215° C. for eight hours under a vacuumed pressure of 0.4 torr. As a result, aliphatic polyester (b) having a melting point of about 102° C. was obtained.

The aliphatic polyester (b) had a number average molecular weight of 17,100 and a weight average molecular weight of 40,300.

500 g of the aliphatic polyester (b) was put into a 1-liter separable flask and then melted at 180° C. in nitrogen gas flow. Thereafter, 2.5 g of diphenylisodecylphosphite (JPM-311 manufactured by Johoku Chemical Co., Ltd.) was added thereto. Further. 10 g of diphenylmethanediisocyanate hydride was added thereto at 190° C.

As a result, there was no gelation though the viscosity swiftly increased. The thus produced biodegradable high molecular weight aliphatic polyester (B-1) was white crystals slightly ivory colored and had a melting point of approximately 105° C., a number average molecular weight of 38,200 and a weight average molecular weight of 177,000.

For comparison, 500 g of the aliphatic polyester (b) was separately put into a 1-liter separable flask, and in the same manner as mentioned above 10 g of diphenylmelhanediisocyanate hydride was added at 190° C. to render polyester (B-2) with an increased viscosity in a light yellowish brown color and having a melting point of about 105° C., a number average molecular weight of 39,400 and a weight average molecular weight of 187,000.

The polyesters (B-1) and (B-2) were put into a test tube and left at 180° C. for the measurement of MFR (Melt Flow Rate: JIS-K-7210 A method; temperature 125° C.; load 2.16 kg) and the hue change. The results are shown in Table 1.

TABLE 1

| | hue (Hazen) | | MFR (125° C.) (g/10 min) | |
|---|---|---|---|---|
| Sample | blank | after 5 hrs at 180° C. in the air | blank | after 5 hrs at 180° C. in the air |
| B-1 | 70 | 100 | 0.58 | 2.91 |
| B-2 | 300 | >500 | 0.31 | 11.7 |

It can be clearly seen from Table 1, the polyester B-1 with the diphenylisodecilphosphite added thereto as a stabilizer had a significantly improved thermal hue stability.

EXAMPLE 3

750 g of 1,4-cyclohexanedimethanol, 1010 g of sebacic acid, 5 g of antimony trioxide and 2 g of zinc acetate were put into a 3-liter separable flask equipped with a stirrer, fractionating condenser, a thermometer, and a gas inlet tube and were then esterificated at 205°–210° C. in nitrogen gas flow to render an acid value of 9.2. Thereafter, this was subjected to deglycol reaction at 215°–220° C. for 8 hours under a vacuumed pressure of 0.5 torr. As a result, aliphatic polyester (d) in white crystal with a light ivory color having a melting point of about 80° C., a number average molecular weight of 11,200, and a weight average molecular weight 57,500 was obtained.

500 g of this aliphatic polyester (d) was put into a 1-liter separable flask and then heated to 180° C. to be melted in nitrogen gas flow. After that, 0.5 g of phosphorous acid was added thereto. The hue changed to colorless. Further, 7 g of hexamethylenediisocyanate was added. The viscosity rapidly increased, but no gelatinization took place. As a result, a stabilized aliphatic polyester (D-1) having a melting point of about 76° C., a number average molecular weight of 16,900, a weight average molecular weight of 152,000 was obtained. Although its molten hue was slightly opaque, it had a quite stable Hazen color scale of 50, and 70 after being heated at 180° for 5 hours.

On the other hand, the polyester (D-2) with an increased viscosity produced by the reaction under the same conditions without adding the phosphorous acid had a melting point of approximately 76° C., a number average molecular weight of 16,000, a weight average molecular weight of 151,000. Its Hazen color scale was 300, and was at least 500 after being left for 5 hours at 180° C.

EXAMPLE 4

205 g of ethylene glycol and 354 g of succinic acid were put in a 1-liter separable flask equipped with a stirrer, a fractionating condenser, a thermometer and a gas inlet tube, and were then esterified at 200°–205° C. in nitrogen gas flow to have an acid value of 7.4. Thereafter, 0.05 g of tetraisopropyltitanate was added thereto. Finally, this was subjected to a deglycol reaction under a vacuumed pressure of 0.5 torr at 210°–215° C. for 8 hours.

The produced aliphatic polyester (e) was in a light yellow wax form and had a melting point of 110° C., a weight average molecular weight of 38,700 and a number average molecular weight of 13,400.

300 g of the aliphatic polyester (e) was put into a 0.5-liter separable flask equipped with a reflux condenser, a dropping funnel, a gas inlet tube and a thermometer, and was then heated and melted at 180° C. in nitrogen gas flow. Thereafter, 3 g of a 10% dioxane solution of phosphorous acid (0.3 g as phosphorous acid) was added thereto.

The slightly yellowish resin turned almost into colorless.

Subsequently, 4 g of hexamethlenediisocyanate was dropped in under stirring. As a result, the viscosity rapidly increased but no gelation took place.

The produced biodegradable high molecular weight aliphatic polyester (E) was in a white wax form and had a melting point of about 111° C., a weight average molecular weight of 100,800, number average molecular weight of 33,800.

The MFR of the biodegradable high molecular weight aliphatic polyester (E) by JIS K7210 at 190° C., load 0.325 kg was 26 g/10 min.

The biodegradable high molecular weight aliphatic polyester (E) was press-molded at 150° C. and is then stretched four times. The resulting film had a thickness of approximately 50 $\mu$m, was transparent and had a tensile strength of 15.6 kg/mm$^2$, much larger than that of polyethylene.

This film prepared from the biodegradable high moleclar weight aliphatic polyester (E) was buried in soil at a depth of 15 cm and subjected to a biodegradability test. After six months, the film is found to be tattered, and after one year it was completely degraded and had no trace of the original form at all.

EXAMPLE 5

395 g of 1,4-butanediol, 418 g oi succinic acid, 808 g of sebacic acid were put into a 2-liter separable flask equipped with a stirrer, fractionating condenser, a thermometer, and a gas inlet tube and then esterified at 200°–205° C. in nitrogen gas flow to render an acid value of 7.1. Thereafter, 0.08 g of tetraisopropyltitanate was added thereto. Finally, this was subjected to deglycol reaction at 210°–215° C. for 8 hours under a vacuumed pressure of 0.6 torr.

The produced aliphatic polyester (f) was a light cream white crystal color, and had a melting point of 107° C., a weight average molecular weight of 34,900 and a number average molecular weight of 14,900.

500 g of the aliphatic polyester (f) was put into a 1-liter separable flask being equipped with a reflux condenser, a dropping funnel, a gas inlet tube, and a thermometer, and then heated and melted at 180° C. in nitrogen gas flow. Thereafter, 2.5 g of trisisodecylphosphite was added thereto.

The color immediately turned into colorless.

Subsequently, 6 g of hexamethylenediisocyanate was dropped therein under stirring. As a result, the viscosity rapidly increased but no gelatinization took place.

The produced biodegradable high molecular weight aliphatic polyester (F) had a melting point of approximately 110° C., weight average molecular weight of 173,000, and a number average molecular weight of 32,200.

The MFR of the biodegradable high molecular weight aliphatic polyester (F) by JIS K7210 at 190° C., load 2.16 kg was 0.8 g/10 min., showing film forming characteristics.

Tensile strength of a film with a thickness oi approximately 40$\mu$m produced by molding the biodegradable high molecular weight aliphatic polyester (F) at 190° C. by an inflation method was 13.9 kg/mm$^2$ and was substantially transparent with a slight opaqueness.

The thus obtained film was buried in black soil at a depth of 20 cm from the ground surface at the foot of Mt. Akagi in Gunma Prefecture, Japan for a biodegradability test. After six months, it had degraded to have no trace of the original form.

EXAMPLE 6

453 g of 1,4-cyclohexanedimethanol and 438 g oi adipic acid were put into a 2-liter separable flask equipped with a stirrer, a fractionating condenser, a thermometer, and a gas inlet tube, and then esterified at 205°–210° C. in nitrogen flow to have an acid value of 9.4. Thereafter, 0.1 of tetraisopropyltitanate and 1 g of zinc acetate were added thereto. Finally, this was subjected to deglycol reaction at 220°-225° C. under a vacuumed pressure of 0.3 torr for 7 hours.

The produced aliphatic polyester (g) was a light ivory colored white crystal and had a melting point of 118° C., a weight average molecular weight of 39,100, and a number average molecular weight of 14,100.

500 g of the aliphatic polyester (g) was put into the same device as in the Example 5 and then heated and melted at 190° C. in nitrogen flow. Thereafter, 2.5 g of triphenylphosphite and 1 g of a 10% dioxane solution of phosphorous acid (0.1 g as phosphorous acid) were added thereto.

As a result, the hue of the molten resin having a Hazen color scale of 200-250 almost instantaneously turned into 50-70.

Subsequently, 7 g of isophoronediisocyanate was dropped thereinto under stirring. As a result, the viscosity rapidly increased but there was no gelation.

The thus produced biodegradable high molecular weight aliphatic polyester (G) had a melting point of about 120° C., a weight average molecular weight of 80,000, and a number average molecular weight of 28,000.

The strength of a transparent film having a thickness of approximately 40 $\mu$m which was formed by press-molding the biodegradable high molecular weight aliphatic polyester (G) and then stretching it five times at 80° C. was 14.7 kg/mm$^2$. In the same biodegradability test as in Example 5, this was tattered after six months, and there was no trace of the original form after one year.

EXAMPLE 7

290 g of 1,4-butanediol, 300 g of succinic anhydride, and 6 g of trimellitic anhydride were put into a 1-liter separable flask equipped with a stirrer, a fractionating condenser, a thermometer, and a gas inlet tube and then esterified at 205°-210° C. in nitrogen flow to have an acid value of 8.4. Thereafter, 0.08 g of tetraisopropyltitanate was added. Finally, this was subjected to deglycol reaction at 215°-220° C. for 8 hours under a vacuumed pressure of 0.5 torr.

The produced aliphatic polyester (h) hads a melting point of 118° C. and was white crystal with slight ivory color having a weight average molecular weight of 108,000 and a number average molecular weight of 24,300.

300 g of the aliphatic polyester (h) was put into the same device as in Example 5 and was then heated at 190° C. in nitrogen gas flow. Thereafter, 1 g of phenylisodecilphosphite and 0.1 g of polyphosphoric acid were added thereto.

The color almost instantaneously turned into colorless.

Subsequently, 6 g of a trimer of hexamethylenediisocyanate (12 g of 50% solution in dioxane) was added thereto. As a result, the viscosity rapidly increased but no gelation took place.

The obtained biodegradable high molecular weight aliphatic polyester (H) had a melting point oi 120° C., white crystal, weight average molecular weight of 193,000 and a number average molecular weight of 28,700.

A strength of a transparent film having a thickness of approximately 50 $\mu$m formed by press-molding the biodegradable high molecular weight aliphatic polyester (H) and thereafter stretching it at 80° C. three times was 16.9 kg/mm$^2$. In the same biodegradability test as in Example 5, signs of biodegradation appeared after six months, and become tattered after one year.

What is claimed is:

1. A method for manufacturing a biodegradable high molecular weight aliphatic polyester comprising the steps of:
    synthesizing an aliphatic polyester having a number average molecular weight of at least 5,000 by reacting aliphatic or alicyclic glycol with aliphatic dicarboxylic acid or its anhydride, applying a 0.001-0.5 part by weight of organic or inorganic metallic compound as a catalyst with respect to 100 parts by weight of aliphatic polyester to be produced;
    adding a 0.01-3 parts by weight of organic or inorganic phosphorus compounds with respect to 100 parts by weight of aliphatic polyester upon completion of the reaction; and
    reacting a 0.1-5 parts by weight of polyfunctional isocyanate compound with 100 parts by weight of the aliphatic polyester so that the polyester has a number average molecular weight of at least 10,000.

2. A method for manufacturing a biodegradable high molecular weight aliphatic polyester comprising the steps of:
    synthesizing an aliphatic polyester having a weight average molecular weight of at least 30,000 by reacting aliphatic or alicyclic glycol with aliphatic dicarboxylic acid or its anhydride, applying a 0.001-0.5 part by weight of organic or inorganic metallic compound as a catalyst with respect to 100 parts by weight of aliphatic polyester to be produced;
    adding a 0.01-3 parts by weight of organic or inorganic phosphorus compound with respect to 100 parts by weight of aliphatic polyester completion of the reaction; and
    reacting a 0.1-5 parts by weight of polyfunctional isocyanate compound with 100 parts by weight of the aliphatic polyester so that the polyester has a weight average molecular weight of at least 50,000.

3. A method for manufacturing a biodegradable high molecular weight aliphatic polyester comprising the steps of:
    synthesizing an aliphatic polyester having a number average molecular weight of at least 5,000 and a weight average molecular weight of at least 30,000 by reacting aliphatic or alicyclic qlycol with aliphatic dicarboxylic acid or its anhydride, applying 0.001-0.5 part by weight of organic or inorganic metallic compound as a catalyst with respect to 100 parts by weight of aliphatic polyester to be produced
    adding a 0.01-3 parts by weight of organic or inorganic phosphorus compound with respect to 100 parts by weight of aliphatic polyester upon completion of the reaction; and
    reacting a 0.1-5 parts by weight of polyfunctional isocyanate compound with 100 parts by weight of the aliphatic polyester so that the polyester has a number average molecular weight of at least 10,000 and a weight average molecular weight of at least 50,000.

4. A method for manufacturing a biodegradable high molecular weight aliphatic polyester according to any one of claims 1-3, wherein at least one kind of multifunctional compound selected from a group consisted of polyhydric alcohol having at least three functional groups, polybasic carboxylic acid having at least three functional groups or its anhydride, and oxycarboxylic acid having at least three functional groups, at the reaction of the aliphatic or alicyclic glycol with the aliphatic dicarboxylic acid or its anhydride in the step.

* * * * *